(12) United States Patent
Sarkar

(10) Patent No.: US 8,559,303 B2
(45) Date of Patent: *Oct. 15, 2013

(54) PREVENTION OF BANDWIDTH ABUSE OF A COMMUNICATIONS SYSTEM

(75) Inventor: Falguni Sarkar, Redmond, WA (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/586,304

(22) Filed: Aug. 15, 2012

(65) Prior Publication Data

US 2012/0309347 A1  Dec. 6, 2012

Related U.S. Application Data

(63) Continuation of application No. 11/429,369, filed on May 5, 2006, now Pat. No. 8,274,884.

(51) Int. Cl.
*H04J 3/16* (2006.01)
(52) U.S. Cl.
USPC .......................................... 370/229; 370/468
(58) Field of Classification Search
USPC ......... 370/229, 230, 235, 255, 431, 437, 445, 370/468; 455/406
See application file for complete search history.

(56) References Cited

U.S. PATENT DOCUMENTS

| | | | |
|---|---|---|---|
| 5,673,393 A | 9/1997 | Marshall et al. | |
| 5,839,063 A | 11/1998 | Lee | |
| 6,591,265 B1 | 7/2003 | Erickson et al. | |
| 6,628,639 B1 | 9/2003 | Ishii | |
| 7,023,857 B1 * | 4/2006 | Chiussi et al. | 370/395.4 |
| 7,079,534 B1 | 7/2006 | Medhat et al. | |
| 7,508,763 B2 | 3/2009 | Lee | |
| 8,274,884 B1 * | 9/2012 | Sarkar | 370/229 |
| 2001/0043613 A1 | 11/2001 | Wibowo et al. | |
| 2005/0185666 A1 | 8/2005 | Raya et al. | |

OTHER PUBLICATIONS

Perez-Costa, X. et al., "Optimal Radio Acess Bearer Configuration for Voice over IP in 3G UMTS Networks", 2004, 6 pages.
Utran, Wikipedia, the free encyclopedia, http://en.wikipedia.org/wiki/UTRAN, Apr. 11, 2006, 1 page.

* cited by examiner

*Primary Examiner* — Yemane Mesfin
*Assistant Examiner* — Mon Cheri Davenport
(74) *Attorney, Agent, or Firm* — Woodcock Washburn LLP

(57) ABSTRACT

A user of a communications network is prevented from consuming an excessive amount of channel bandwidth by restricting use of the channel in accordance with the type of data being downloaded to the user. The user is provided an initial number of credits. As the user consumes the credits, the data being downloaded is checked to determine if is permissible or non-permissible. Non-permissible data includes file-sharing files and movie downloads if user subscription does not permit such activity. If the data is permissible, the user is provided another allotment of credits equal to the initial allotment. If the data is non-permissible, the user is provided an allotment of credits less than the initial allotment. Various restriction policies also can be applied, such as levying additional fees and/or terminating the user's access to the channel. Also, incentives can be provided to entice the user curb the misuse.

20 Claims, 4 Drawing Sheets

PREVENTION OF BANDWIDTH ABUSE OF A COMMUNICATIONS SYSTEM

CROSS REFERENCE TO RELATED APPLICATIONS

This application is a continuation of, and claims priority to, U.S. patent application Ser. No. 11/429,369, filed May 5, 2006, now U.S. Pat. No. 8,274,884 issued Sep. 25, 2012, which is incorporated by reference herein in its entirety.

TECHNICAL FIELD

The technical field generally relates to communications systems and more specifically relates to preventing excessive abuse of a channel in a communications system.

BACKGROUND

With the development of newer wireless communications equipment, and the development of more sophisticated processing techniques, users can enjoy higher bandwidth connections to wireless networks. For example, a user can download and/or upload pictures and video. More recently, with the advent of high-speed downlink packet access (HSDPA) and high-speed uplink packet access (HSUPA), users have gained the ability to transfer large amounts of data, such as to implement file sharing and download movies or large audio files.

Because a wireless network is shared by many users, transfers of such large files can result in denial of access to other users of the network until some of the channel bandwidth becomes available. Previous attempts in wire-line systems to address this type of use (misuse) include monitoring channel traffic and terminating a subscription or terminating communications if misuse is detected. This is not a practicable solution in a wireless network for several reasons. Additional hardware would have to be installed resulting in additional cost of the system. By the time the misuse is detected, resources will have already been allocated. Further, shutting down a user completely can result in a loss of revenue.

SUMMARY

Use of a communications system is restricted in accordance with the type of information being carried over a communications channel. When a user communicates over a channel, the type of communication is checked to determine if it is of a type that will use an excessive amount of bandwidth. For example, a subscriber using more bandwidth than allowed by the subscription service plan, or a user not subscribing to the appropriate service plan, would be considered excessive use of the bandwidth. If it is determined that the type is a non-permissible type (e.g., use excessive bandwidth), the user's access to the channel is restricted. If it is determined that the traffic is of a permissible type, the user's access to the channel is not restricted. Non-permissible types of communications can include file sharing, and downloading/uploading large files.

BRIEF DESCRIPTION OF THE DRAWINGS

The foregoing and other objects, aspects and advantages will be better understood from the following detailed description with reference to the drawings, in which.

DETAILED DESCRIPTION OF ILLUSTRATIVE EMBODIMENTS

Upon initiation of communication over a channel in a communications system, a user is provided with a predetermined initial channel allotment. This allotment can be in the form of an initial predetermined number of credits, for example, wherein each credit is indicative of predetermined amount of time that the user can use the channel. The credit also can be indicative of the maximum bandwidth available to the user. In an example embodiment, as described in more detail below, access to the channel is determined by Radio Access Bearer (RAB) parameters. As the user comes close to using up the initial allotment of credits (e.g., one credit remaining), the traffic is analyzed to determine if it is permissible or non-permissible. If the traffic is determined to be permissible, the user is provided another allotment of credits, which can be for example, the same number of credits as the initial number of credits. If the traffic is determined to be non-permissible, the user is provided a lesser amount of credits than initially provided. The lesser amount, can be for example, equal to half the initial amount. Each time the user comes close to using up the previous allotment of credits, the traffic is analyzed and if the traffic is non-permissible, the number of credits is reduced. In an example embodiment, the number of credits is reduced to half of the most recent preceding allotment amount each time the traffic is analyzed and determined to be non-permissible.

If the user continues to communicate over the channel with a non-permissible communication type, various restriction policies can be applied. For example, the billing department of the user's network can be informed, thus resulting in additional charges to the user, and/or the user's access to the channel can be terminated. In an example embodiment, if after the user's allotment has been reduced, the user continues to use the channel with a permissible type of data rather than a non-permissible type of data, the user is provided additional credits.

Figure 1:
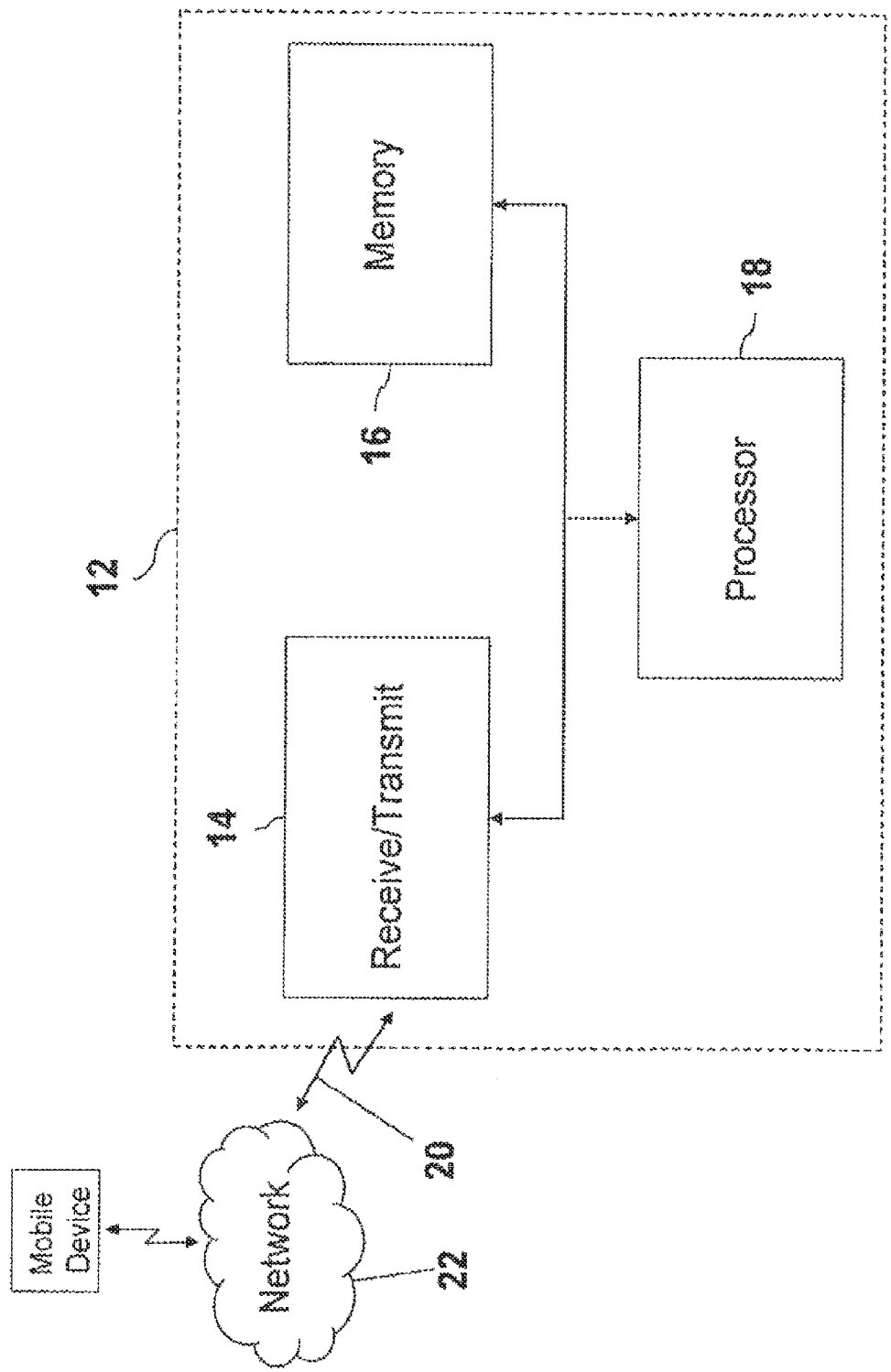
FIG. 1 is a block diagram of an exemplary communication processor for preventing abuse of a communications system.

FIG. 1 is a block diagram of an example communication processor 12 for preventing bandwidth abuse in a communications system. The communication processor 12 can comprise any appropriate computing device, such as a client processor, a server processor, and/or a component in a wireless communications system, for example. The communication processor 12 also can comprise a distributed processor. The communication processor 12 comprises a receiving and transmitting portion 14, a memory portion 16, and a processing portion 18. The receive/transmit portion 14 receives and transmits information via interface 20. The interface 20 can be a wireless link, a hardwired interface, or a combination thereof. In an exemplary embodiment, the communication processor 12 communicates with a network 22, such as a wireless communications network for example, via the interface 20. The communication processor 12 can be part of the network 22.

In an example configuration, the communication processor 12 is part of a communications network, such as a Universal Mobile Telecommunications System (UMTS) Terrestrial Radio Access Network (UTRAN), for example. The UTRAN can carry various types of communication traffic including circuit switched traffic and Internet Protocol (IP) packet switched traffic. Also, the UTRAN can carry high bandwidth data in accordance with the High-Speed Downlink Packet Access (HSDPA) protocol and the high-speed uplink packet access (HSUPA). The HSDPA defines a high-speed downlink shared channel (HS-DSCH) that is used for downlink communications to user equipment (UE), such as a mobile device. The HSUPA is a mobile data access technology that is capable of providing 5.76 Mbps data speed on the up link. In many ways it is similar to HSDPA. On the Up Link, HSUPA is expected to use an enhanced dedicated channel (E-DCH) on which it will employ link adaptation methods similar to those employed by HSDPA. The E-DCH also will be shared between many users, and thus the concept of restricting channel use for abusive users is applicable thereto. Scheduling of the HS-DSCH is accomplished at the base station (referred to as a Node-B) of the UTRAN. The Node-B uses channel dependent scheduling to share the downlink channel between users. The Node-B uses information (e.g., channel conditions) received from the users to determine which users will receive a downlink transmission and how much data will be transmitted. The amount of bandwidth allocated to the HS-DSCH is determined by the UTRAN.

An entity known as a Radio Access Bearer (RAB) is responsible for transporting frames of data within the UTRAN. The RAB comprises changeable parameters including frame size, time period, and maximum bandwidth. These parameters are configured and modified by the UTRAN. More specifically, these parameters are modifiable by a radio network controller (RNC) of the UTRAN, and in an example embodiment, by the communication processor 12. In an example embodiment, the communication processor 12 controls allocation of the UTRAN bandwidth via the RAB to prevent bandwidth abuse in a communications system.

Figure 2:
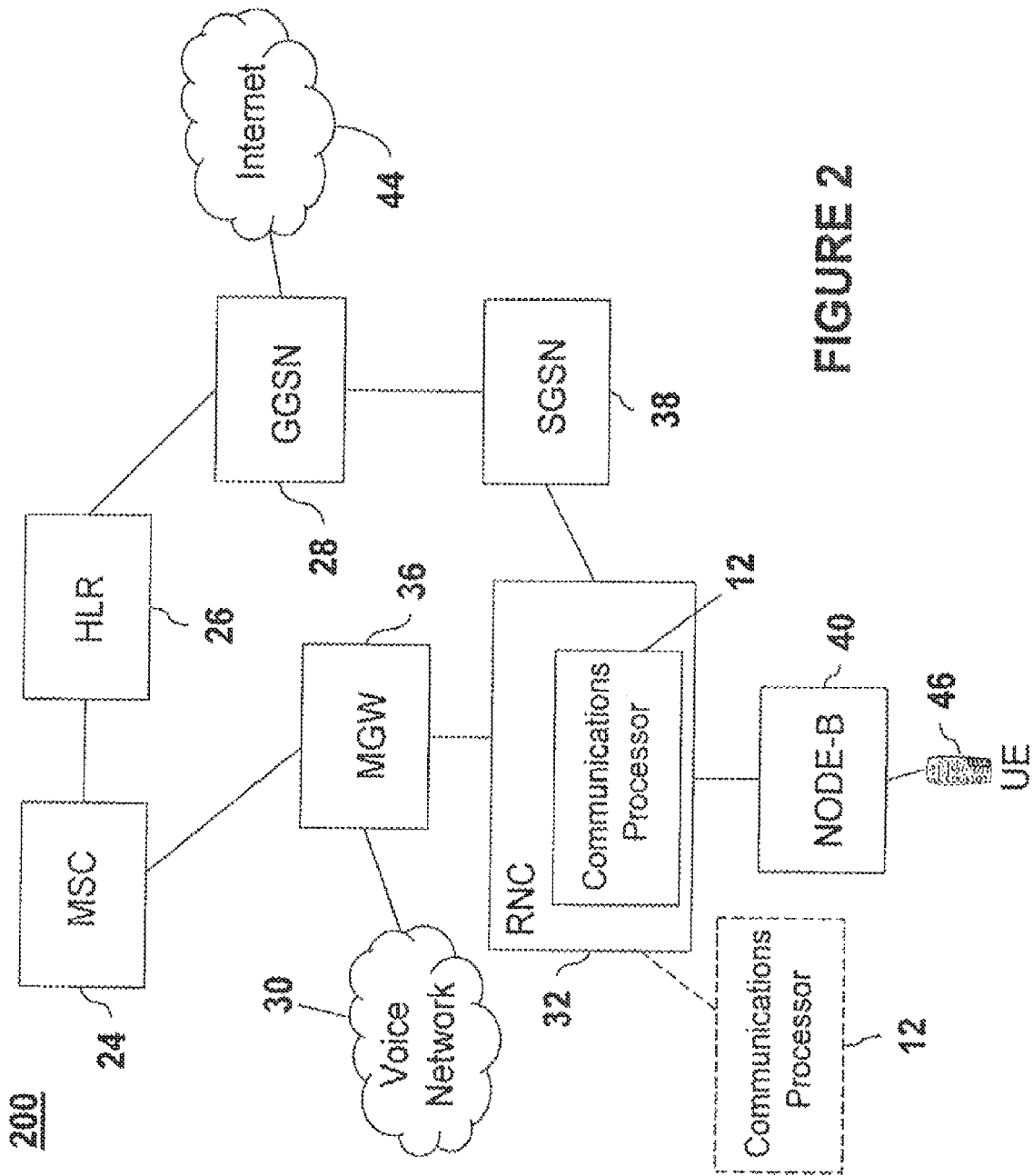
FIG. 2 is an illustration of an example network for preventing abuse of a communications system.

FIG. 2 is an illustration of an example UTRAN 200 in which the communication processor 12 can be implemented for preventing bandwidth abuse in a communications system. The UTRAN 200 comprises at least one radio network controller (RNC) 32 and at least one Node-B 40. The Node-B 40 and the RNC 32 can be separate devices or can be the same device. The RNC 32 provides control functions for each Node-B 40 of the UTRAN 200. The Node-B 40 is a base station that can comprise physical equipment, such as a radio tower, that enables a radio interface to communicate with the User Equipment (UE) 46. Each Node-B 40 can serve more than one UE 46. The UE 46 comprises physical equipment or mobile equipment, such as a mobile phone, a mobile device, a PDA, a laptop computer, or the like.

The media gateway (MGW) 36 functions as a translation unit between networks, such as the UTRAN 200 and the voice network 30. The MGW 36 enables multimedia communications via various transport protocols, such as the IP for example.

The UTRAN 200 also connects to a mobile switching center (MSC) 24. The MSC 24 performs switching functions for the UTRAN 200. The MSC 24 also performs other functions, such as registration, authentication, location updating, handovers, and call routing. The MSC 24 periodically queries a home location register (HLR) 26 for subscriber's information. The HLR 26 comprises a database that contains administrative information regarding each subscriber registered in a corresponding UTRAN and/or possibly other network types. The HLR 26 also contains the current location of each UE 46.

The UTRAN 200 also connects to a serving general packet radio service system support node (SGSN) 38 and a gateway GPRS support node (GGSN) 28. The SGSN 38 controls the connection between the UTRAN and the UE 46. The SGSN 38 also keeps track of individual UE's locations and manages security functions and access controls. The GGSN 28 provides a gateway between the UTRAN 200 and a public packet data network (PDN) or other general packet radio service (GPRS) networks 44, such as the internet for example. A PDN is a network established and operated by a telecommunications administration, or a recognized private operating agency, for the specific purpose of providing data transmission service for the public. Thus, the GGSN 28 provides interworking functionality with external packet data networks, and sets up a logical link to the UE 46 through the SGSN 38. When packet switched data leaves the UTRAN 200, it is transferred to an external TCP-IP network 44, such as an X.25 network or the Internet. To access GPRS services, the UE 46 first attaches itself to the UTRAN 200 by performing an attach procedure. The UE 46 then activates a packet data protocol (PDP) context, thus activating a packet communication session between the UE 46, the SGSN 38, and the GGSN 28.

It is emphasized that the network 200 is exemplary and not intended to imply a specific implementation. Each component of the network 200 can be implemented in a single component or multiple components. Each processor can be implemented in a single processor or multiple processors. Multiple components/processors can be distributed or centrally located. Multiple components/processors can communicate wirelessly, via hard wire, or a combination thereof.

As depicted in FIG. 2, the communication processor 12 can be a part of the RNC 32 or an adjunct to (dotted lines) the RNC 32. The communication processor 12 performs and/or manages functions to prevent bandwidth abuse in the UTRAN 200. In an example embodiment, the processing portion 18 of the communication processor 12 provides a predetermined initial channel allotment. The predetermined allotment can be any appropriate allotment indicative of maximum allowable bandwidth and/or frame size. For example, a user could be allocated twenty credits, wherein each credit is equivalent to a permission to use a RAB of higher bandwidth, such as 384 Kbps (kilo-bits per second) or greater for 20 ms (milli-seconds). The initial channel allotment can be the same for each user. The channel can be any appropriate channel, such as a HS-DSCH, for example. The processing portion 18 also is capable of determining if communications over the channel is one of a permissible type and a non-permissible type. Non-permissible types of communications include communications that use an excessive amount of channel bandwidth. Examples of non-permissible types of communications include file-sharing and downloading large files (e.g., movies) when user's subscription does not allow such activity. Permissible types of communications include communications that do not use an excessive amount of channel bandwidth, such a voice, for example. The communication type is indicated in the PDP context. The communication processor 12 is capable of parsing and analyzing the traffic corresponding to the PDP context to determine communication type.

If the communications is of a permissible type, the processing portion 18 provides a subsequent channel allotment equal to the initial channel allotment. Thus, if the user is not misusing the channel bandwidth, the user is provided another allotment of channel bandwidth. In an example embodiment, this subsequent allotment is the same as the initial allotment, although any appropriate allotment can be provided. If the user is misusing the channel bandwidth, as indicated by the communications being of a non-permissible type, the processing portion 18 provides a subsequent channel allotment that is less than the initial channel allotment. In an example embodiment, this subsequent allotment is half the initial allotment, although any appropriate reduced allotment can be provided. As the allotted channel bandwidth is consumed, at some predetermined threshold, the processing portion 18 analyzes the communications to determine if it is permissible or non-permissible. The threshold can be any appropriate threshold, such as one remaining credit, for example. If the communications is a permissible type, the processing portion 18 provides another channel allocation. In an example embodiment, this allocation is equal to the most recent preceding allotment. If the communications is a non-permissible type, the processing portion 18 provides another channel allocation that is less than the most recent preceding allocation. In an example embodiment, this allocation is equal to half of the most recent preceding allotment.

The process of consuming allocated bandwidth, checking the type of the communications, and providing subsequent bandwidth allocation in accordance with the communications type, is iteratively continued until the communications are terminated. In an example embodiment, if the user previously misused the bandwidth, and more recently has not misused the bandwidth, the user is provided an incrementally greater bandwidth allocation. Thus, the user is rewarded for correcting his/her bad behavior.

As described above, a mechanism is provided for the UTRAN to identify misuse of communications channels and regulate RAB allocation. To accomplish this, each HSDPA subscriber establishes one or more PDP contexts in the UTRAN. A PDP context activates a communication session between a mobile device and the network. Each PDP context is associated with one or more traffic streams. When the UE has data in its buffer and is ready to transmit the data, the UE requests a RAB allocation from the scheduler (e.g., the RNC) in the UTRAN. Once the RAB is allocated, the UE uses that RAB for the allocated duration to transmit data. RAB allocation can be associated with the PDP context for the UE. The RNC periodically checks every PDP context using a tunable parameter (e.g., maximum bandwidth, frame size). If abuse is detected, RAB allocation is denied and user's future traffic is subjected to more scrutiny. However if future requests are found to be legitimate, the user is allocated more free RAB access in smaller increments until an upper limit is reached.

Figure 3:
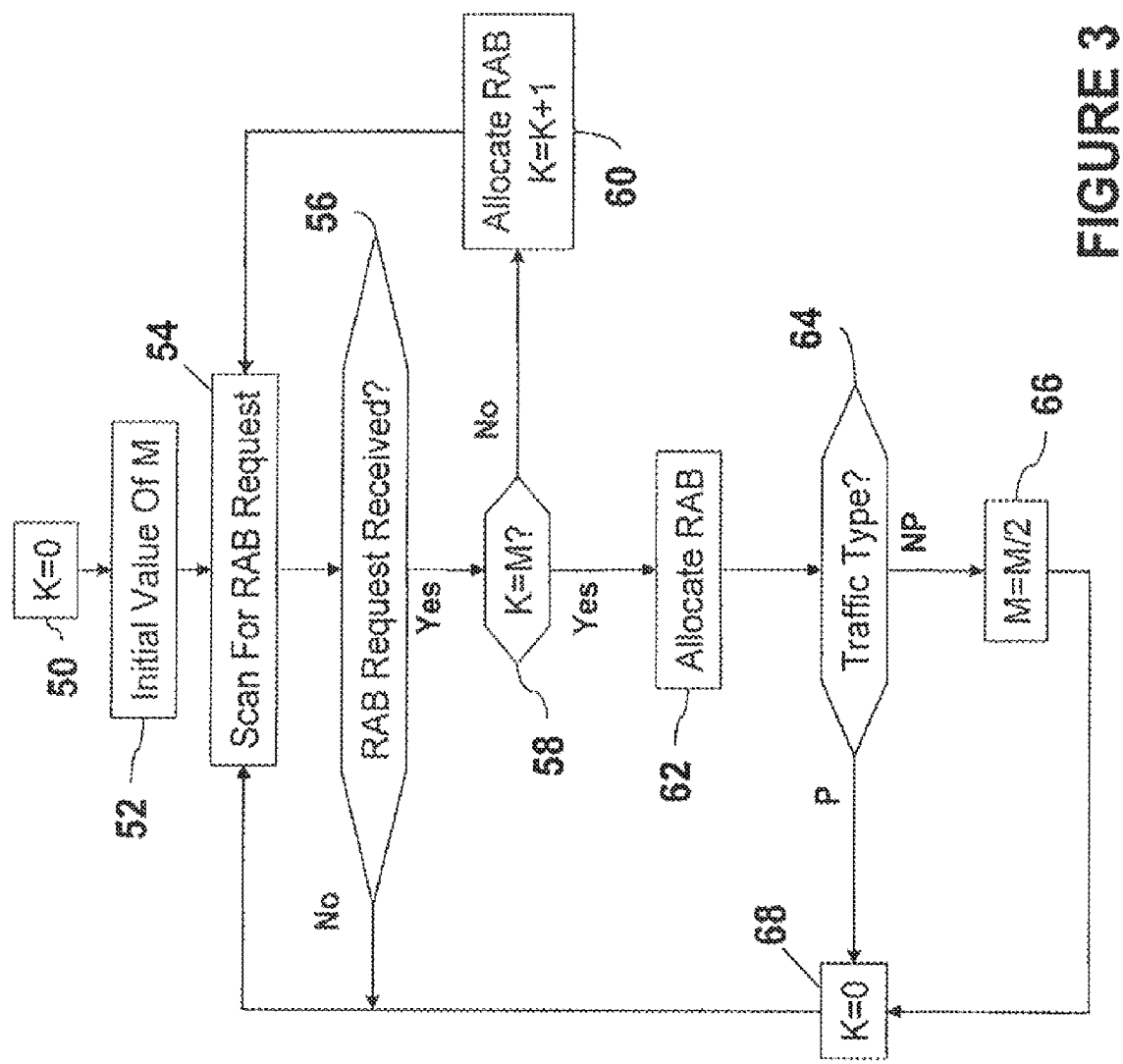
FIG. 3 is a flow diagram of an example process for preventing abuse of a communications system.

FIG. 3 is a flow diagram of an example process for preventing abuse of channel bandwidth in a communications network. A counter, referred to as K in FIG. 3, is initialized to zero at step 50. The number of credits, M, is assigned to a user at step 52. M represents the number of credits per user. Thus, for different users, M could be initialized to different values. In an example embodiment, M is initialized to the same value for all users. In an example embodiment, for a user having a PDP context activated in the GGSN, the value of M represent the number of allowable RAB requests. The value of M will change for each user, dependent upon a respective user's usage of the channel.

RAB requests are scanned for at step 54. At step 56, it is determined if a RAB request was received. If a RAB request was not received (step 56) the process proceeds to step 54 to continue scanning for RAB requests. If a RAB request is received (step 56), it is determined if K is equal to M at step 58. That is, it is determined if the number of allowable RAB requests is equal to the counter value at step 58. If K is not equal to M (step 58), the RAB is allocated and the counter is incremented by one, at step 60. Allocating the RAB request allows the user to communicate over the channel. The process then proceeds to step 54 to scan for RAB requests. This processing loop (steps 54-56-58-60-54) is iterated, until the counter value, K, which is being incremented each iteration of the loop, is equal to the number of allowable RAB requests, M.

If K is equal to M (step 58), the RAB is allocated and the type of traffic is determined at step 64. If, at step 64, it is determined that the type of traffic is permissible (P), the counter, K, is initialized to zero at step 68, and the process proceeds to step 54 and continues as described above. The traffic type is determined by parsing and analyzing data transmitted using the PDP context. A permissible traffic type includes any type of traffic that does not use excessive channel bandwidth. Non-permissible type traffic is traffic that uses excessive channel bandwidth, such as file sharing and large downloads, for example. If, at step 64, it is determined that the traffic is of a non-permissible type (NP), the allowable number of RAB requests, M, is reduced to half the previous amount at step 66.

As depicted in the example process in FIG. 3, if the user continues to misuse the channel bandwidth, by continuing to download non-permissible types of data for example, the value of allowable RAB requests, M, will eventually be less than one. At this point, the user's use of the channel can be terminated, and/or other restrictions policies can be implemented. This is not depicted in FIG. 3.

Figure 4:
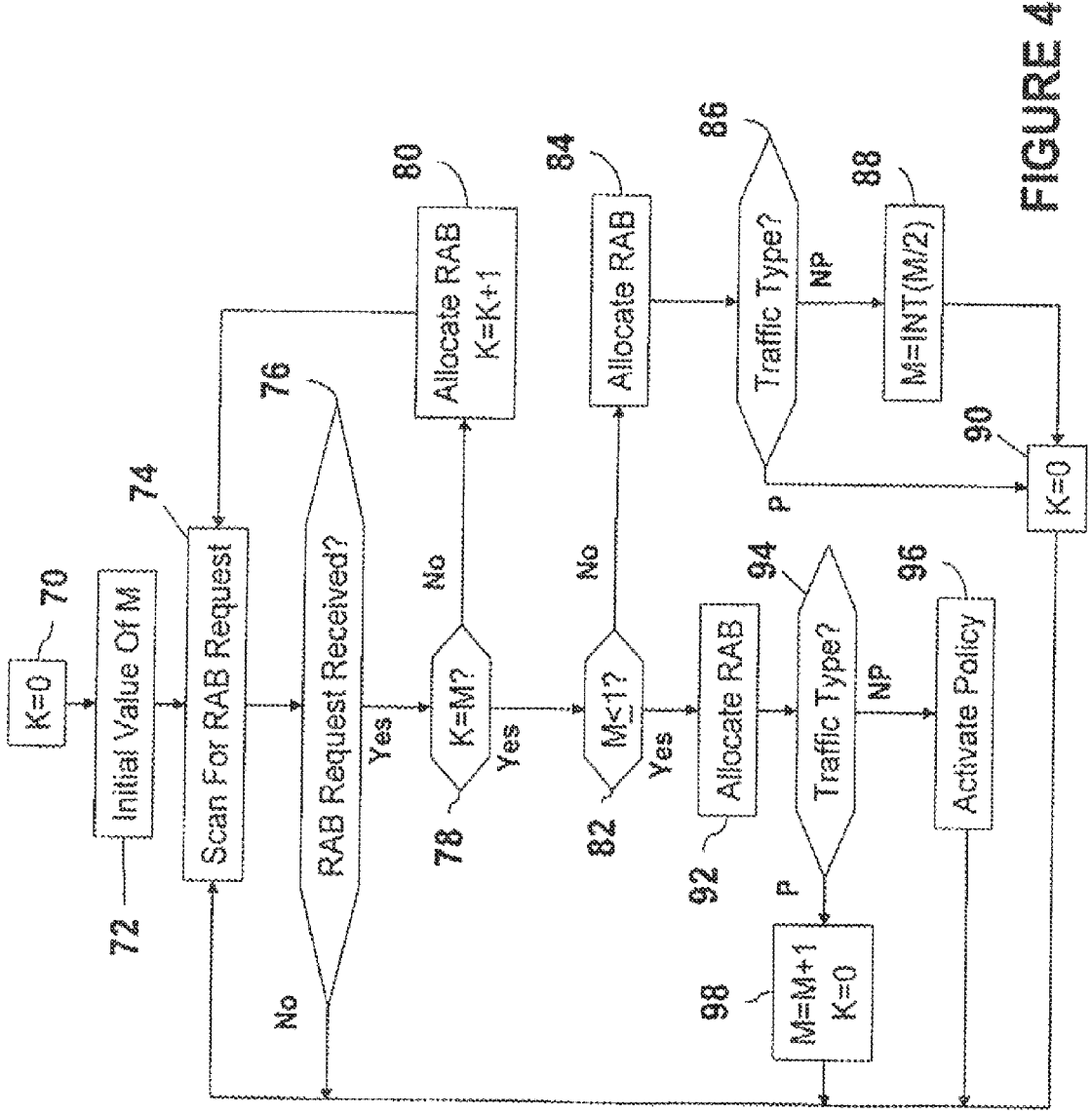
FIG. 4 is a flow diagram of another example process for preventing abuse of a communications system.

FIG. 4 is another flow diagram of an example process for preventing abuse of channel bandwidth. The process in FIG. 4 depicts additional restriction policies and an incentive for the user, after misusing the channel, to properly use the channel.

A counter, K, is initialized to zero at step 70. The number of credits, M, is assigned to a user at step 72. As described above, M represents the number of credits per user. Thus, for different users, M could be initialized to different values. In an example embodiment, M is initialized to the same value for all users. In an example embodiment, for a user having a PDP context activated in the GGSN, the value of M represent the number of allowable RAB requests. The value of M will change for each user, dependent upon a respective user's usage of the channel.

RAB requests are scanned for at step 74. At step 76, it is determined if a RAB request was received. If a RAB request was not received (step 76) the process proceeds to step 74 to continue scanning for RAB requests. If a RAB request is received (step 76), it is determined if K is equal to M at step 78. That is, it is determined if the number of allowable RAB requests is equal to the counter value at step 78. If K is not equal to M (step 78), the RAB is allocated and the counter is incremented by one, at step 80. Allocating the RAB request allows the user to communicate over the channel. The process then proceeds to step 74 to scan for RAB requests. This processing loop (steps 74-76-78-80-74) is iterated, until the counter value, K, which is being incremented each iteration of the loop, is equal to the number of allowable RAB requests, M.

If K is equal to M (step 78), it is determined, at step 82, if the number of allowable RAB requests, M, is equal to or less than one. If it is determined that the value of M is greater than one (i.e., not less than or equal to one), the RAB is allocated at step 84 and the type of traffic is determined at step 86. If, at step 86, it is determined that the type of traffic is permissible (P), the counter, K, is initialized to zero at step 90, and the process proceeds to step 74 and continues as described above. The traffic type is determined by parsing and analyzing the data transmitted using the PDP context. A permissible traffic type includes any type of traffic that does not use excessive channel bandwidth. Non-permissible type traffic is traffic that uses excessive channel bandwidth, such as file sharing and large downloads, for example.

If, at step 86, it is determined that the traffic is of a non-permissible type (NP), the allowable number of RAB requests, M, is equated to the integer portion of half the previous value of M at step 88. For example, if the previous value of M was 3, the value of M after execution of step 88 is 1, and if the previous value of M was 1, the value of M after execution of step 88 is 0. The counter, K, is initialized to zero at step 90, and the process proceeds to step 74 and continues as described above.

If, at step 82, it is determined that the value of M is less than or equal to one, the RAB is allocated at step 92 and the traffic type is determined at step 94. If, at step 94, it is determined that the type of traffic is permissible (P), the counter, K, is initialized to zero and, in an exemplary embodiment, the value of M is incremented by one, at step 90. The value of M can be incremented by any appropriate value. Thus, the user is rewarded for curbing the his/her bad behavior by providing additional credits (allowable RAB requests). The process then proceeds to step 74 and continues as described above. If, at step 94, it is determined that the traffic is of a non-permissible type (NP), an optional restriction policy can be activated at step 96. Any appropriate restriction policy can be activated. For example, the user's use of the channel can be terminated, the appropriate billing group can be notified resulting in the user being levied additional charges, the user could receive a warning via his/her UE that service will be terminated if misuse continues (or other appropriate message), or a combination thereof. If the user's use of the channel is not terminated, the process to step 74 and continues as described above.

While exemplary embodiments for preventing abuse of a communications system have been described in connection with various computing devices, the underlying concepts can be applied to any computing device or system capable of preventing abuse of a communications system.

The various techniques described herein can be implemented in connection with hardware or software or, where appropriate, with a combination of both. Thus, the methods and apparatus for preventing abuse of a communications system, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer (e.g., communication processor 12 of FIG. 1), the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for preventing abuse of a communications system can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing preventing abuse of a communications system. When implemented on a general-purpose processor, the program code combines with the processor to provide a unique apparatus that operates to invoke the functionality of preventing abuse of a communications system. Additionally, any storage techniques used in connection with preventing abuse of a communications system can invariably be a combination of hardware and software.

While methods, apparatuses, and systems for preventing abuse of a communications system have been described in connection with exemplary embodiments of the various figures, it is to be understood that other similar embodiments can be used or modifications and additions can be made to the described embodiments for performing the same function of preventing abuse of a communications system without deviating therefrom. Therefore, prevention of abuse of a communications system should not be limited to any single embodiment, but rather should be construed in breadth and scope in accordance with the appended claims.

What is claimed:

1. A network entity comprising:
   memory having instructions stored thereon; and
   a processor coupled to the memory, the processor configured to execute the instructions to perform operations comprising:
      establishing a first credit threshold;
      establishing a second credit threshold;
      incrementing an initial number of credits;
      determining if a radio access bearer request has been received;
      comparing the first credit threshold to the initial number of credits after the radio access bearer request has been received;
      comparing the second credit threshold to the first credit threshold after the first credit threshold equals the incremented initial number of credits;
      examining permissibility of a communication when the first credit threshold is less than or equal to the second credit threshold; and
      implementing a restrictive policy for the communication when the communication is determined to be non-permissible.

2. The network entity of claim 1, wherein when the communication is determined to be non-permissible the first credit threshold is decreased by one-half.

3. The network entity of claim 1, wherein each credit of the initial number of credits is indicative of at least one wireless radio access bearer request.

4. The network entity of claim 3, wherein the restrictive policy comprises restricting a channel allotment of equipment.

5. The network entity of claim 1, wherein if the communication is determined to be permissible, increasing the first credit threshold.

6. The network entity of claim 5, wherein the permissible communication comprises voice traffic.

7. The network entity of with claim 1, wherein the non-permissible communication comprises file-sharing data.

8. The network entity of claim 3, wherein the radio access bearer request comprises at least one of a maximum bandwidth and a time period.

9. The network entity of claim 1, wherein the restrictive policy comprises levying of additional fees to a subscriber.

10. The network entity of claim 1, wherein the network entity is part of a wireless network, the wireless network comprising at least one of a general packet radio service (GPRS) network, a global system for mobile communications (GSM) network, and a universal mobile telecommunications service (UMTS) network.

11. The network entity of claim 10, wherein the wireless network comprises high-speed downlink packet access.

12. A tangible computer-readable storage medium that is not a propagating signal, the computer-readable storage medium having executable instructions stored thereon, that when executed by a processor, cause the performance of operations comprising:
    establishing a first credit threshold;
    establishing a second credit threshold;
    incrementing an initial number of credits if the first credit threshold is not reached;
    determining if the first credit threshold has been reached by the incremental initial number of credits;
    if the first credit threshold is reached:
        resetting the incremented initial number of credits to the initial number of credits;
        analyzing a communication to determine if the communication is non-permissible;
        if the communication is determined to be non-permissible, decreasing the first credit threshold; and
        if the communication is determined to be permissible, increasing the first credit threshold;
    comparing the second credit threshold to the first credit threshold; and
    implementing a policy based on whether the first credit threshold reaches the second credit threshold.

13. The computer-readable storage medium of claim 12, wherein when the communication is determined to be non-permissible the first credit threshold is decreased by one-half.

14. The computer-readable storage medium of claim 12, wherein each credit of the initial number of credits is indicative of at least one wireless radio access bearer request.

15. The computer-readable storage medium of claim 14, wherein the policy comprises restricting a channel allotment of equipment.

16. The computer-readable storage medium of claim 12, wherein the non-permissible communication comprises file-sharing data.

17. A tangible computer-readable storage medium that is not a propagating signal, the computer-readable storage medium having executable instructions stored thereon, that when executed by a processor, cause the performance of operations comprising:
    establishing a first credit threshold;
    establishing a second credit threshold;
    incrementing an initial number of credits if the first credit threshold is not reached, wherein each credit of the initial number of credits is indicative of at least one wireless radio access bearer request;
    determining if the first credit threshold has been reached by the incremental initial number of credits;
    if the first credit threshold is reached:
        resetting the incremented initial number of credits to the initial number of credits;
        analyzing a communication to determine if the communication is non-permissible; and
        if the communication is determined to be non-permissible, decreasing the first credit threshold when the communication is determined to be non-permissible;
    comparing the second credit threshold to the first credit threshold; and
    implementing a policy based on whether the first credit threshold reaches the second credit threshold.

18. The computer-readable storage medium of claim 17, wherein when the communication is determined to be non-permissible the first credit threshold is decreased by one-half.

19. The computer-readable storage medium of claim 17, wherein the non-permissible communication comprises file-sharing data.

20. The computer-readable storage medium of claim 17, wherein the policy comprises restricting a channel allotment of equipment.

\* \* \* \* \*